(12) United States Patent
Lee et al.

(10) Patent No.: US 6,690,856 B2
(45) Date of Patent: Feb. 10, 2004

(54) OPTICAL WAVEGUIDE FILTER USING MULTI-MODE INTERFERENCE

(75) Inventors: Doohwan Lee, Gyonggi-do (KR); Sangsun Lee, Seoul (KR)

(73) Assignee: Hanbit Information & Communication Co., Seoul (KR)

( * ) Notice: Subject to any disclaimer, the term of this patent is extended or adjusted under 35 U.S.C. 154(b) by 12 days.

(21) Appl. No.: 10/004,812

(22) Filed: Dec. 7, 2001

(65) Prior Publication Data

US 2003/0077033 A1 Apr. 24, 2003

(30) Foreign Application Priority Data

Aug. 16, 2001 (KR) ........................ 2001-49416

(51) Int. Cl.[7] .............................................. G02B 6/26
(52) U.S. Cl. ........................................................ 385/27
(58) Field of Search ................................... 385/27, 147

(56) References Cited

U.S. PATENT DOCUMENTS

| | | | | |
|---|---|---|---|---|
| 5,946,331 A | * | 8/1999 | Amersfoort et al. | 372/23 |
| 6,366,709 B1 | * | 4/2002 | Shekel et al. | 385/8 |
| 6,374,002 B1 | * | 4/2002 | Shekel et al. | 385/8 |
| 6,421,476 B1 | * | 7/2002 | Shekel et al. | 385/17 |
| 6,487,325 B2 | * | 11/2002 | Shekel et al. | 385/8 |
| 6,556,730 B2 | * | 4/2003 | Shekel et al. | 385/8 |
| 6,580,534 B2 | * | 6/2003 | Madsen | 385/24 |
| 6,584,242 B2 | * | 6/2003 | Shekel et al. | 385/8 |

FOREIGN PATENT DOCUMENTS

| | | |
|---|---|---|
| KR | 1999-020073 | 3/1999 |
| KR | 2001 0010582 | 2/2001 |
| KR | 2001 0041551 | 5/2001 |
| WO | 99/45420 | 9/1999 |

OTHER PUBLICATIONS

Lucas B. Soldano et al., "Optical Multi–Mode Interference Devices Based on Self–Imaging: Principles and Applications", Journal of Lightwave Technology, vol. 13, No. 4, pp. 615–627, Apr., 1995.

* cited by examiner

*Primary Examiner*—Akm Enayet Ullah
(74) *Attorney, Agent, or Firm*—Greenblum & Bernstein, P.L.C.

(57) ABSTRACT

An optical waveguide filter including a multi-mode waveguide having a predetermined width, a predetermined length and a predetermined thickness includes a transmitting light source and a photo detector coupled to one side of the multi-mode waveguide; and a transmission line coupled to the other side of the multi-mode waveguide, wherein one hundred percent of an output optical power having a first wavelength from the transmitting light source is transferred to the transmission line, and one hundred percent of an input optical power having a second wavelength from the transmission line is transferred to the photo detector.

12 Claims, 7 Drawing Sheets

OPTICAL WAVEGUIDE FILTER USING MULTI-MODE INTERFERENCE

BACKGROUND OF THE INVENTION

1. Field of the Invention

The present invention relates to an optical waveguide filter, and more particularly, to an optical waveguide filter using a multi-mode interference.

2. Description of Related Art

As a data transmission capacity increases, a wavelength division multiplexing (WDM) system is recently in the spotlight. The WDM system requires a transceiver module that performs an optic-electric conversion and an electric-optic conversion. In particular, since the WDM system is a two-way communication system having a wavelength of 1310 nm and 1550 nm, a filtering element of the transceiver module is a very important element that separates the two wavelengths.

Such a filtering element includes a beam splitter, a directional coupler and a thin film filter.

The beam splitter (e.g., disclosed in Korean Patent Publication no. 2001-41551) relates to a two-way optical circulator and a wavelength divider module that can amplify an optical signal in both two ways in order to achieve a two-way optical communication through a single optical fiber.

However, the beam splitter has a disadvantage in that it is difficult to integrate the beam splitter and to configure the beam splitter together with a peripheral transmitting/receiving circuit.

The directional coupler (e.g., disclosed in Korean Patent Publication no. 1999-20073) is a waveguide element that makes two waveguides close to each other and changes a propagating path of an optical signal from one waveguide to the other waveguide using a mode-coupling refractive index.

The thin film filter (e.g., disclosed in Korean Patent Publication no. 2001-10582) is a wavelength filtering element that deposits a dielectric film having a suitable refractive index on a substrate to reflect or transmit a desired wavelength.

However, even though it is possible to integrate, the directional coupler and the thin film filter have a problem in that there is a limitation as to a miniaturization and a manufacturing tolerance is low.

SUMMARY OF THE INVENTION

To overcome the problems described above, preferred embodiments of the present invention provide an optical waveguide filter which is suitable for an integration and a miniaturization.

It is another object of the present invention to provide an optical waveguide filter having a large manufacturing tolerance.

It is a still object of the present invention to provide an optical waveguide filter which is relatively less sensitive to a TE/TM polarization in consideration of an optical loss.

It is a still yet object of the present invention to provide an optical waveguide filter which is low in loss resulting from a connection with peripheral elements.

It is still another object of the present invention to provide a small-sized optical waveguide filter.

In order to achieve the above object, the preferred embodiments of the present invention provide an optical waveguide filter using a multi-mode interference and having a predetermined width, a predetermined length and a predetermined thickness, comprising: a transmitting light source and a photo detector coupled to one side thereof; and a transmission line coupled to the other side thereof, wherein one hundred percent of an output optical power having a first wavelength from the transmitting light source is transferred to the transmission line, and one hundred percent of an input optical power having a second wavelength from the transmission line is transferred to the photo detector.

A length between the transmission line, and the photo detector and the transmitting line is determined by a beat length ratio. The transmitting light source and the photo detector are located at trisection points of the width of the filter. The transmission line is located at a trisection point of the width of the filter.

The present invention further provides an optical waveguide filter using a multi-mode interference and having a predetermined width and a predetermined length, comprising: a transmitting light source and a photo detector coupled to one side thereof; and a transmission line and a monitoring photo detector coupled to the other side thereof, wherein an output optical power having a first wavelength from the transmitting light source is divided at a predetermined percent and transferred to the transmission line and the monitoring photo detector, and one hundred percent of an input optical power having a second wavelength from the transmission line is transferred to the photo detector.

A length between the transmission line and the monitoring photo detector, and the photo detector and the transmitting line is determined by a beat length ratio. The transmitting light source and the photo detector are located at trisection points of the width of the filter, at quadrisection points of the width of the filer, or at points that the width of the waveguide is divided into five. The transmission line and the monitoring photo detector are located at trisection points of the width of the filter, at quadrisection points of the width of the filter, or at points that the width of the filter is divided into five.

The optical waveguide filter using a multi-mode interference according to the present invention has the following advantages. First, the optical waveguide filter anticipates an optical power distribution ratio. Also, since a length of the optical waveguide filter can be reduced compared to the conventional directional coupler, an integration and a miniaturization of the optical waveguide filter can be achieved. Further, since the optical waveguide filter has a width of tens of micrometers ($\mu$m), the optical waveguide filter can have a large manufacturing tolerance. The inventive optical waveguide filter can be made insensitively to the TE/TM polarization even though an optical loss occurs. Besides, since the optical waveguide filter is small-sized and can be manufactured in a single manufacturing process, the optical waveguide filter is low in loss resulting from a connection with peripheral elements such as a laser diode or a photo detector.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Figure 1A:
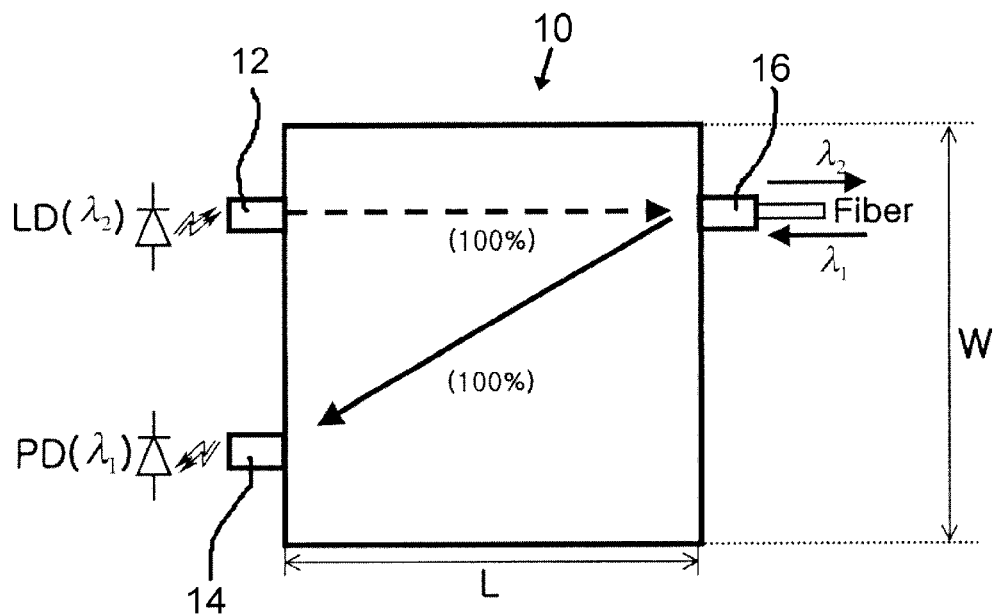
FIGS. 1A to 1D show an optical waveguide filter using a multi-mode interference according to a first preferred embodiment of the present invention.

Reference will now be made in detail to preferred embodiments of the present invention, example of which is illustrated in the accompanying drawings.

FIGS. 1A to 1D show the optical waveguide filter using a multi-mode interference according to a first preferred embodiment of the present invention.

The optical waveguide filter 10 has a width W, a length L and a thickness d, and provides a strong guiding that keeps all forms of modes therein. The optical waveguide filter 10 uses a multi-mode interference and is a multi-mode interference element.

The multi-mode interference element is one which a constructive interference between modes reproduces an image of a wave excited when input in a predetermined length when a certain input wave is applied. This is an inherent characteristic of light called a self-image formation, and is a phenomenon that one or more images are periodically formed along a progress direction of the waveguide. A basic principle of this multi-mode interference is described in J. Lightwave Technol., vol13, p. 615, 1995.

The multi-mode interference element is used for one-way communication system. However, the present invention employs the multi-mode interference element in the WDM system for use in, e.g., a two-way communication system.

Input/output (I/O) terminals 12, 14 and 16 are arranged on both sides of the optical waveguide filter 10, respectively. A laser diode LD is coupled to the IO terminal 12 as a transmitting light source. A photo detector PD is coupled to the IO terminal 14. An optical fiber is coupled to the IO terminal 16 as a transmission line.

An input beam having a first wavelength $\lambda_1$ from the optical fiber is applied to the photo detector, and an output beam having a wavelength $\lambda_2$ from the transmitting light source is applied to the optical fiber. In particular, one hundred percent of an output of the optical fiber is transferred to the photo detector, and one hundred percent of an output of the transmitting light source is transferred to the optical fiber.

In this optical waveguide filter, an output for a monitoring of the transmitting light source is transferred to a monitoring photo detector through an output plane opposite to the transmitting light source without passing through the multi-mode interference filter. Or, a transmitting light source/photo detector volumetric light source is used for a monitoring of the transmitting light source.

An input beam having a wavelength $\lambda_1$ from the optical fiber progresses to the photo detector, and an output beam having a wavelength $\lambda_2$ from the transmitting light source progresses to the optical fiber. One self-image is formed in a cross state or in a bar state.

Figure 1B:
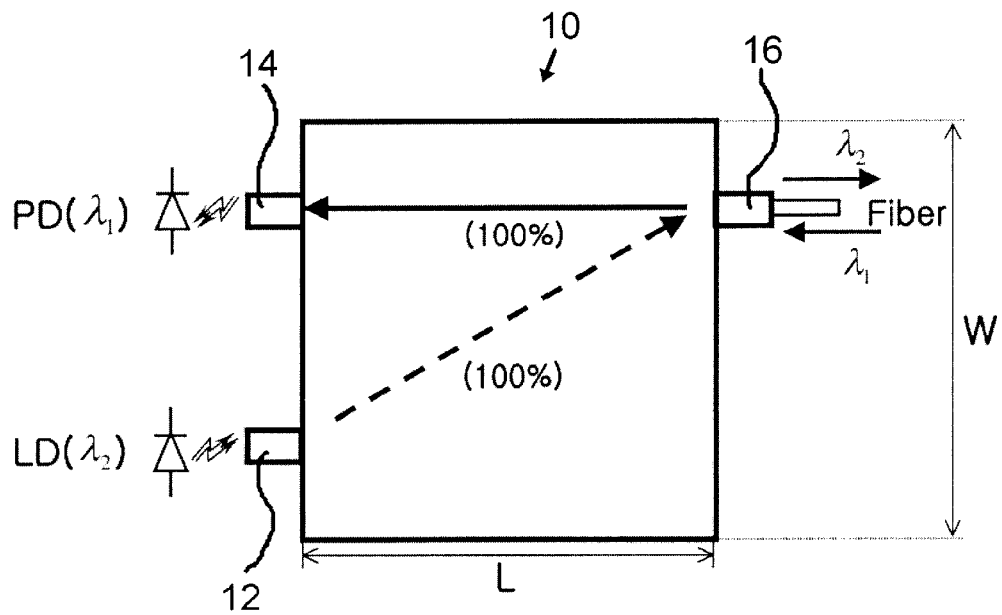

As shown in FIGS. 1A and 1B, in case that the I/O terminals 12, 14 and 16 of the optical waveguide filter 10 are located at a general location thereof, when a general interference is used, a length L that a desired number of self-images are formed is obtained by Equation 1:

$$L = \frac{M}{N}(3L_\pi) \qquad \text{Equation 1}$$

where M denotes an integer which represents a period, N denotes the number of the self-image, and $L_\pi$ denotes a beat length. The beat length $L_\pi$ is obtained by Equation 2:

$$L_\pi = \frac{\pi}{(\beta_0 - \beta_1)} \cong \frac{4n_e W_e^2}{3\lambda_0}, \qquad \text{Equation 2}$$

where $\beta_0$ and $\beta_1$ denote a propagation constant of a standard mode and a propagation constant of a first mode, respectively, $\lambda_0$ denote a wavelength, $n_e$ denotes an effective refractive index, and $W_e$ denotes a substantial width of the standard mode. As can be seen in Equation 2, a beat length depends on a wavelength. Therefore, a length of the optical waveguide filter is determined by an integer that the lengths of two wavelengths are equal:

$$L_{N=1}{}^{\lambda 1} = p(3L_\pi{}^{\lambda 1}), L_{N=1}{}^{\lambda 2} = q(3L_\pi{}^{\lambda 2}) \qquad \text{Equation 3.}$$

wherein N denotes the number of a self-image, $\lambda_1$ and $\lambda_2$ denote a wavelength, and "p" and "q" denote an integer. When the output beam of the optical fiber is a cross state, "p" denotes an odd number, and "q" denotes an even number. When the output beam of the optical fiber is a bar state, "p" denotes an even number, and "q" denotes an odd number.

Figure 1C:
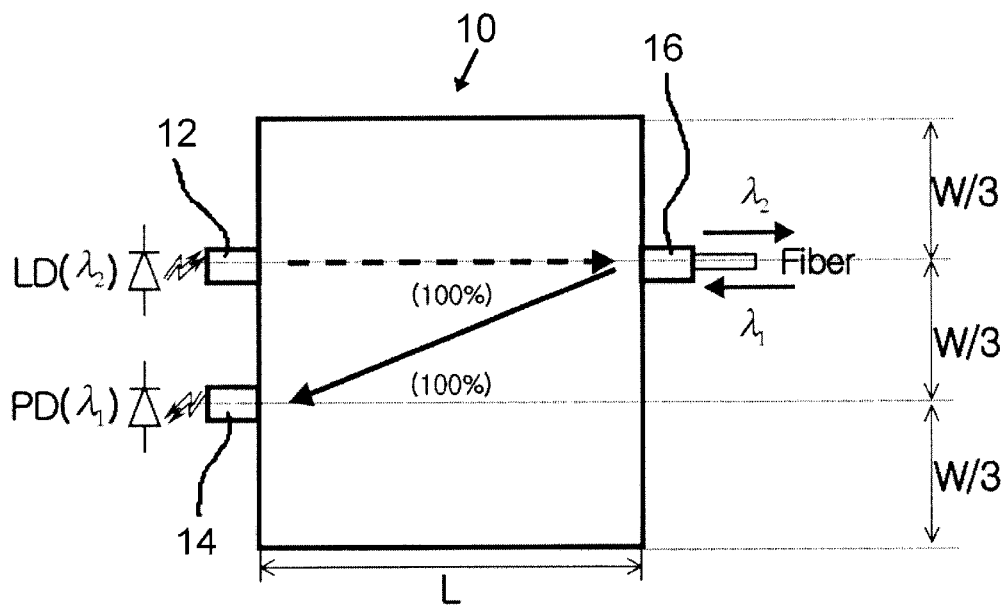
Figure 1D:
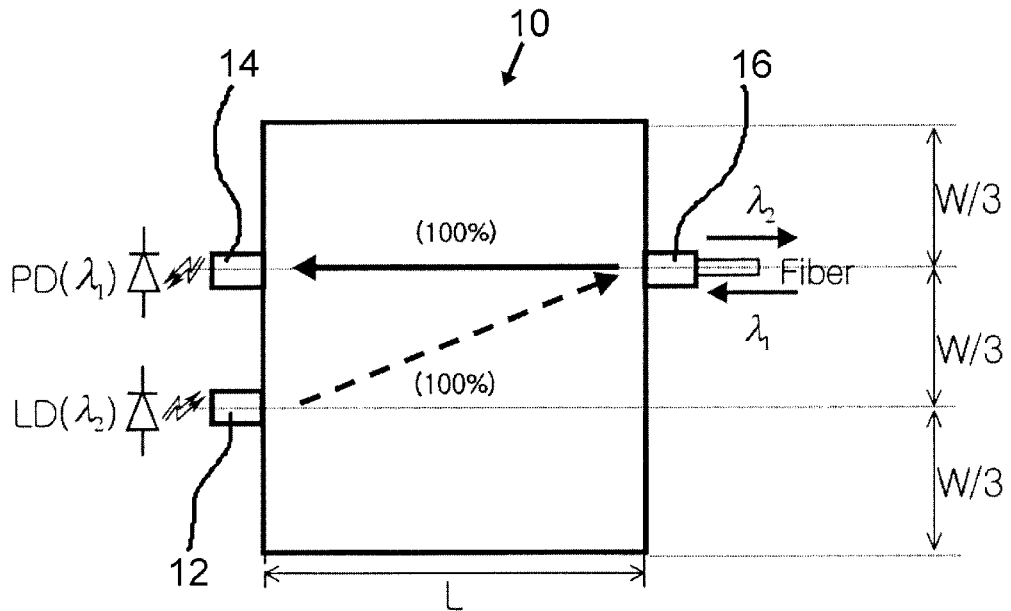

Meanwhile, as shown in FIGS. 1C and 1D, in case that the I/O terminals are located at a W/3 position or a 2W/3 position of the optical waveguide filter 10, when a paired interference is used, a length that a desired-number of the self-self images are formed is obtained by Equation 4:

$$L = \frac{M}{N}L_\pi. \qquad \text{Equation 4}$$

The beat length is obtained by Equation 5:

$$L_{N=1}{}^{\lambda 1} = p(L_\pi{}^{\lambda 1}), L_{N=1}{}^{\lambda 2} = q(L_\pi{}^{\lambda 2}) \qquad \text{Equation 5.}$$

wherein N denotes the number of a self-image, $\lambda_1$ and $\lambda_2$ denote a wavelength, and "p" and "q" denote an integer. When the output beam of the optical fiber is a cross state, "p" denotes an odd number, and "q" denotes an even number. When the output beam of the optical fiber is a bar state, "p" denotes an even number, and "q" denotes an odd number.

A beat length ratio between two wavelengths depends a structure of the optical waveguide filter and a wavelength. In this case, since a transmission is performed in one optical waveguide filter, there is no difference in structure of the optical waveguide filter. Therefore, a beat length ratio becomes proportional to a ratio of two wavelengths. As can be seen in Equation 2, when a wavelength is varied, a beat length is varied. Accordingly, a length of the optical waveguide filter is determined by an integer that lengths of two wavelengths are equal. A beat length ratio that is a parameter to obtain a length of the optical waveguide filter is obtained by Equation 6:

$$\text{Beat length ratio}_{1,2} = \frac{L^{\lambda 1}_{\pi N=1}}{L^{\lambda 2}_{\pi N=1}} = \frac{p}{q}. \qquad \text{Equation 6}$$

Assume that the optical waveguide filter 10 of FIGS. 1A to 1D has a silica-on-silicon structure and has a width of 36 μm and a thickness of 6 μm. When Ge is doped into a core of the optical waveguide filter 10 so that there occurs a refractive index difference of 0.75% between the core and the cladding, $n_{core}$ is 1.3692, and $n_{cladding}$ is 1.3590. At this time, when $\lambda_1$ is 1550 nm and $\lambda_2$ is 1310 nm, a beat length ratio (p/q) becomes close to 1.183, and an integer ratio to have a minimum length is 6/5, whereby $L = L_\pi^{1550} \cong 5L_\pi^{1310} = 11032.1$ μm.

FIGS. 2A to 2F show the optical waveguide filter using a multi-mode interference according to a second preferred embodiment of the present invention.

The optical waveguide filter has a width W, a length L and a thickness d, and has a strong guiding structure that keeps all forms of modes therein.

Input/output (I/O) terminals 12, 14 and 16 are arranged on both sides of the optical waveguide filter 10, respectively. A laser diode LD is coupled to the IO terminal 12 as a transmitting light source. A photo detector PD is coupled to the IO terminal 14. An optical fiber is coupled to the IO terminal 16 as a transmission line. A monitoring photo detector mPD is coupled to the IO terminal 18.

An input beam of a wavelength $\lambda_1$ from the optical fiber progresses to the photo detector, and one self-image is formed in a cross state or in a bar state. An output beam of a wavelength $\lambda_2$ from the transmitting light source is divided into two: a signal output (50%) for a monitoring function; an output (50%) to the optical fiber.

Figure 2A:
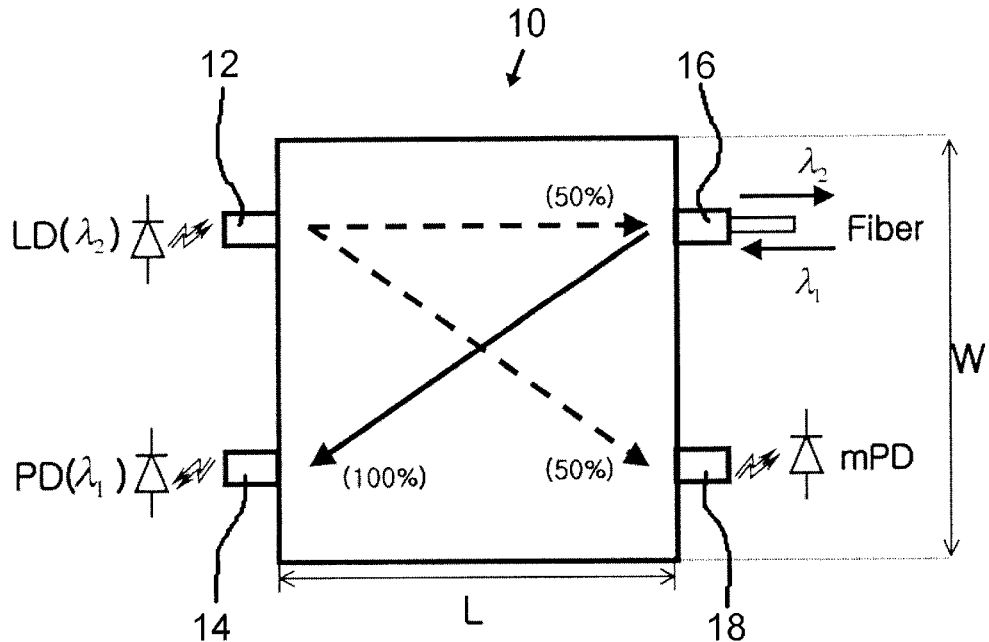
FIGS. 2A to 2F show the optical waveguide filter using a multi-mode interference according to a second preferred embodiment of the present invention.
Figure 2B:
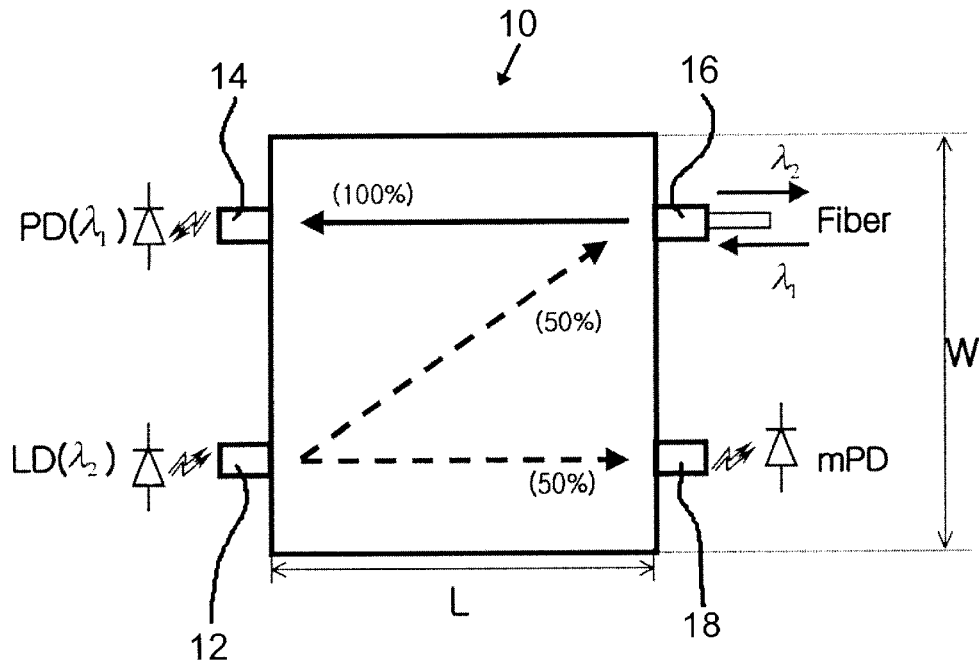

As shown in FIGS. 2A and 2B, in case that the I/O terminals are located at a general position of the optical waveguide filter 10, when a general interference is used, a length L that a desired number of self-images are formed is obtained by Equation 7 using Equations 1 and 2:

$$L^{\lambda 1}_{N=1} = p(3L^{\lambda 1}_\pi), \ L^{\lambda 2}_{N=2} = \frac{q}{2}(3L^{\lambda 2}_\pi) \qquad \text{Equation 7}$$

wherein N denotes the number of a self-image, $\lambda_1$ and $\lambda_2$ denote a wavelength, and "p" and "q" denote an integer. When the output beam of the optical fiber is a cross state, "p" and "q" denote an odd number. When the output beam of the optical fiber is a bar state, "p" denotes an even number, and "q" denotes an odd number.

Figure 2C:
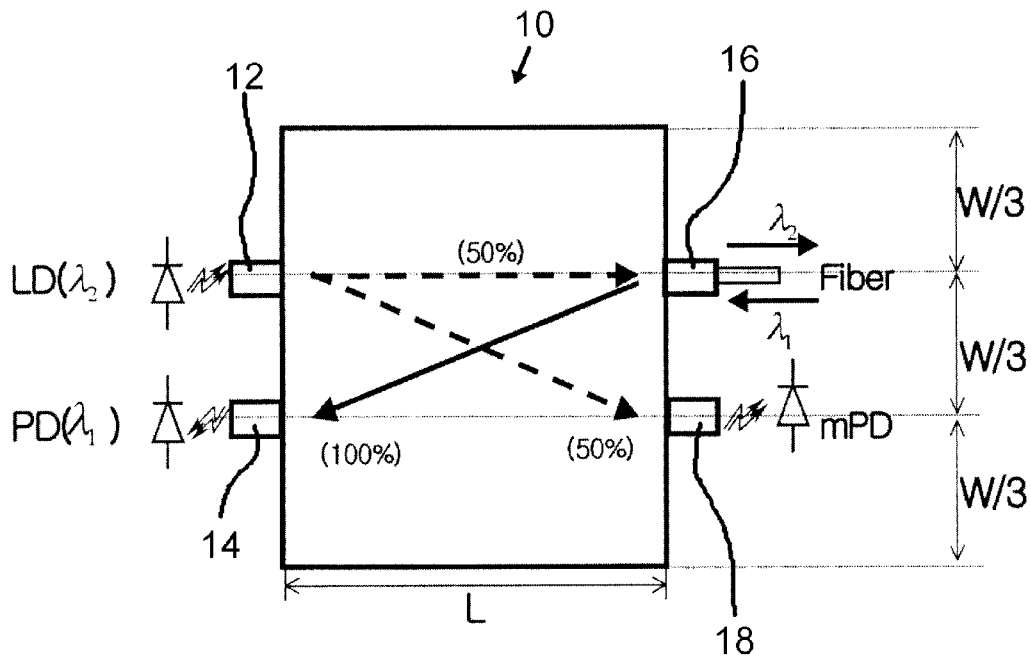
Figure 2D:
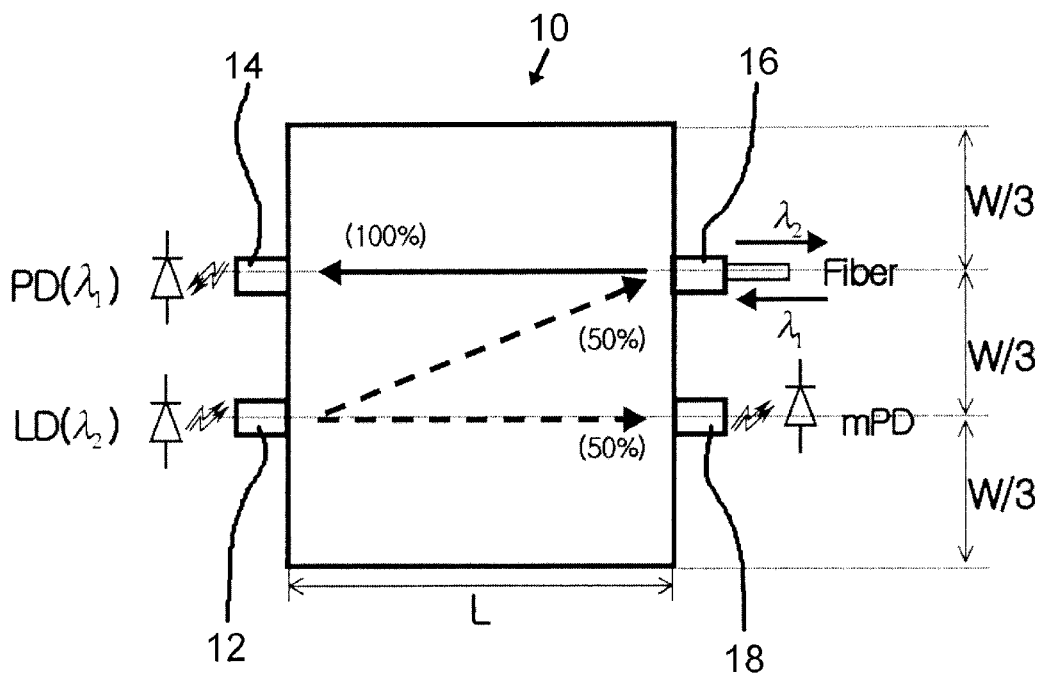

As shown in FIGS. 2C and 2D, in case that the I/O terminals are located at a W/3 position or a 2W/3 position of the optical waveguide filter 10, when a paired interference is used, a beat length that a desired-number of the self-self images are formed is obtained by Equation 8 using Equation 4:

$$L^{\lambda 1}_{N=1} = p(L^{\lambda 1}_\pi), \ L^{\lambda 2}_{N=2} = \frac{q}{2}(L^{\lambda 2}_\pi) \qquad \text{Equation 8}$$

wherein N denotes the number of a self-image, $\lambda_1$ and $\lambda_2$ denote a wavelength, and "p" and "q" denote an integer. When the output beam of the optical fiber is a cross state, "p" and "q" denote an odd number. When the output beam of the optical fiber is a bar state, "p" denotes an even number, and "q" denotes an odd number.

A beat length ratio between two wavelengths depends a structure of the optical waveguide filter 10 and a wavelength. In this case, since a transmission is performed in one optical waveguide filter, there is no difference in structure. Therefore, a beat length ratio becomes proportional to a ratio of two wavelengths. As can be seen in Equation 2, when a wavelength is varied, a beat length is varied. Accordingly, a length of the optical waveguide filter is determined by an integer that lengths of two wavelengths are equal.

A beat length ratio that is a parameter to obtain a length of the optical waveguide filter is obtained by Equation 9:

$$\text{Beat length ratio}_{1,2} = \frac{L^{\lambda 1}_{\pi N=1}}{L^{\lambda 2}_{\pi N=2}} = \frac{2p}{q}. \qquad \text{Equation 9}$$

Figure 2E:
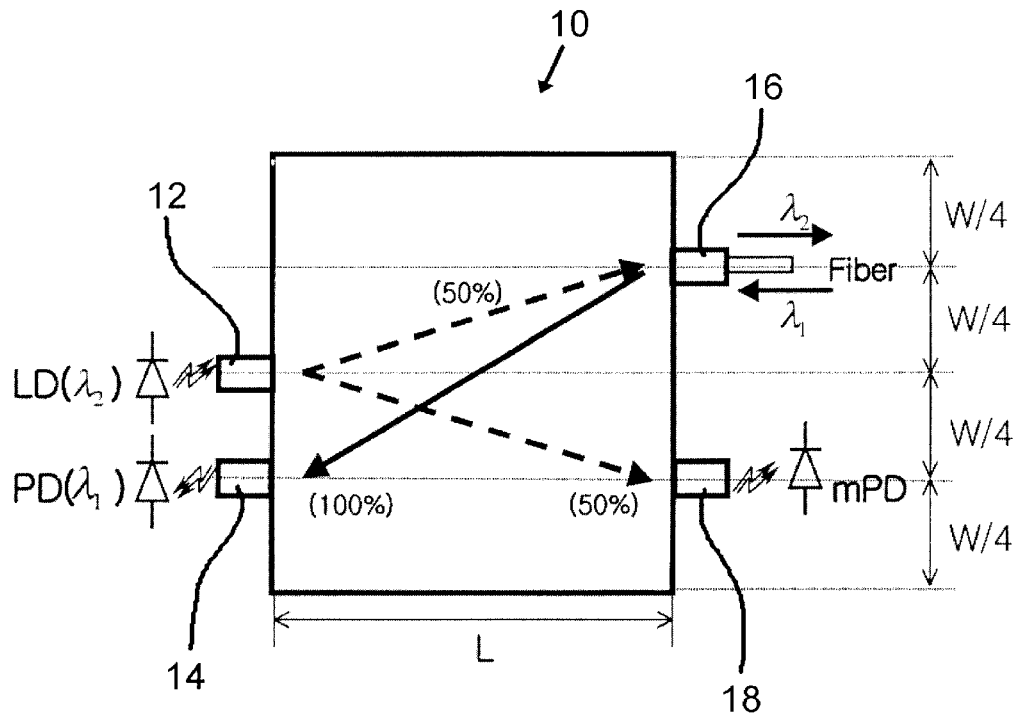
Figure 2F:
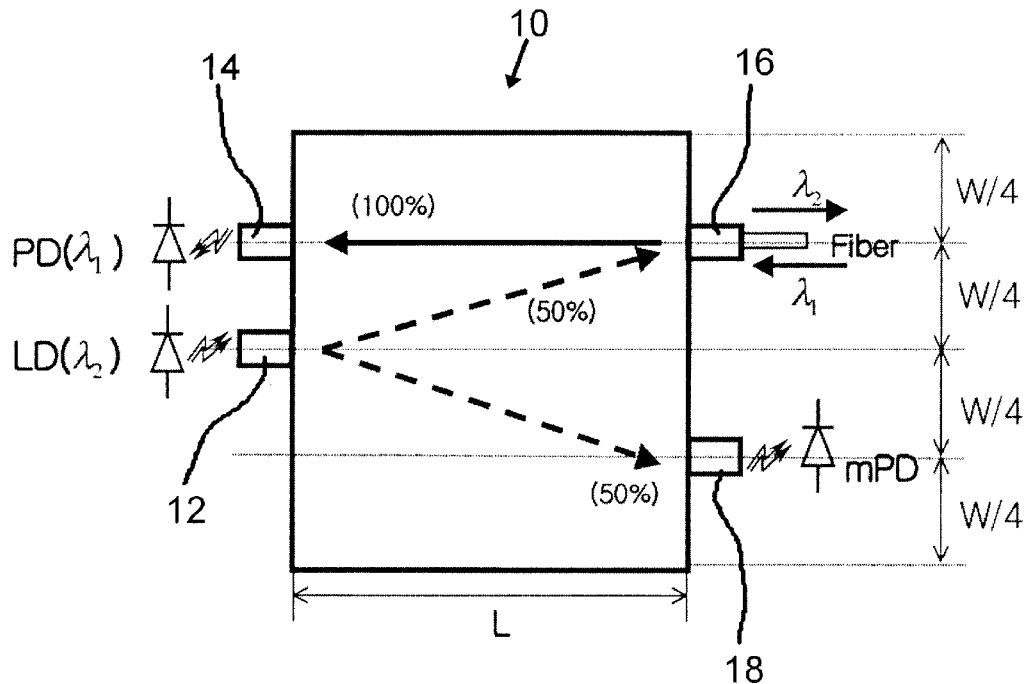

As shown in FIGS. 2E and 2F, in case that the I/O terminals are located at a W/4 position or a W/2 position of the optical waveguide filter 10, the beam of a wavelength $\lambda_1$ from the optical fiber progresses to the photo detector, and one self-image is formed in a cross state or in a bar state. The output beam of a wavelength $\lambda_2$ of the optical fiber progresses to the photo detector is divided into two outputs: a signal output (50%) for a monitoring function; and an output (50%) to the optical fiber. A beat length that the desired number of the self images are formed is obtained by Equation 10 using Equations 1 and 2:

$$L^{\lambda 1}_{N=1} = p(3L^{\lambda 1}_\pi), \ L^{\lambda 2}_{N=2} = \frac{q}{2}\left(\frac{3}{4}L^{\lambda 2}_\pi\right) \qquad \text{Equation 10}$$

wherein N denotes the number of a self-image, $\lambda_1$ and $\lambda_2$ denote a wavelength, and "p" and "q" denote an integer. When the output beam of the optical fiber is a cross state, "p" and "q" denote an odd number. When the output beam of the optical fiber is a bar state, "p" denotes an even number, and "q" denotes an odd number.

In this case, a beat length ratio that is a parameter to obtain a length of the optical waveguide filter is obtained by Equation 11:

$$\text{Beat length ratio}_{1,2} = \frac{L^{\lambda 1}_{\pi N=1}}{L^{\lambda 2}_{\pi N=2}} = \frac{8p}{q}. \qquad \text{Equation 11}$$

Assume that the optical waveguide 10 filter of FIGS. 2A to 2F has a silica-on-silicon structure and has a width of 36 μm and a thickness of 6 μm. When Ge is doped into a core of the optical waveguide filter 10 so that there occurs a refractive index difference of 0.75% between the core and the cladding, $n_{core}$ is 1.3692, and $n_{cladding}$ is 1.3590. At this time, when $\lambda_1$ is 1550 nm and $\lambda_2$ is 1310 nm, a beat length ratio (2p/q) becomes close to 1.183, and an integer ratio to have a minimum length is 6/5, whereby $$L = 3L^{1550}_\pi \cong \frac{5}{2}L^{1310}_\pi = 5513.0 \text{ μm}.$$

Figure 3A:
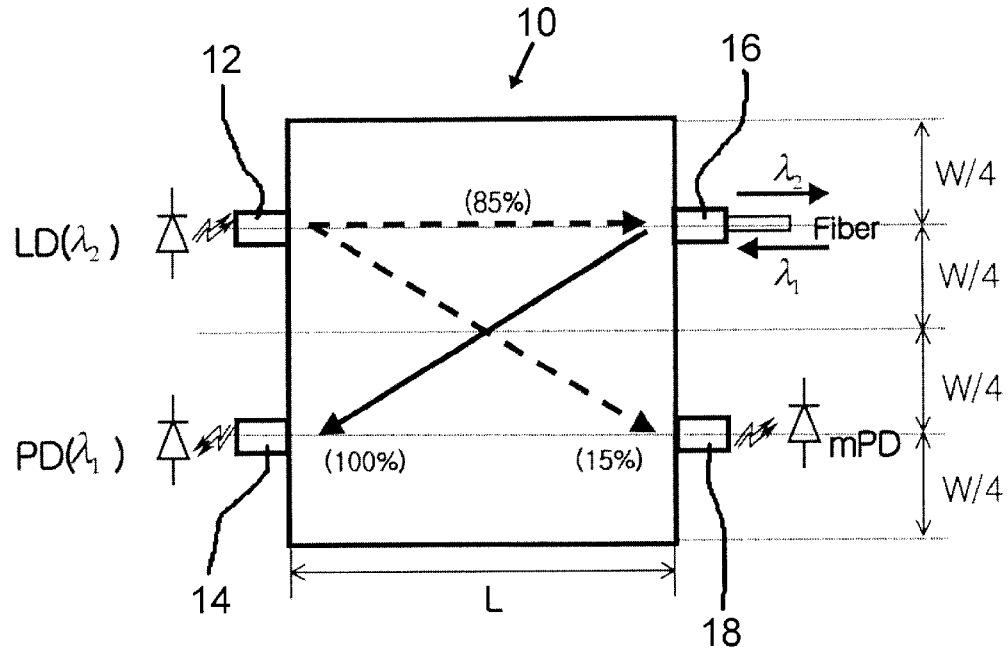
FIGS. 3A and 3B show the optical waveguide filter using a multi-mode interference according to a third preferred embodiment of the present invention.
Figure 3B:
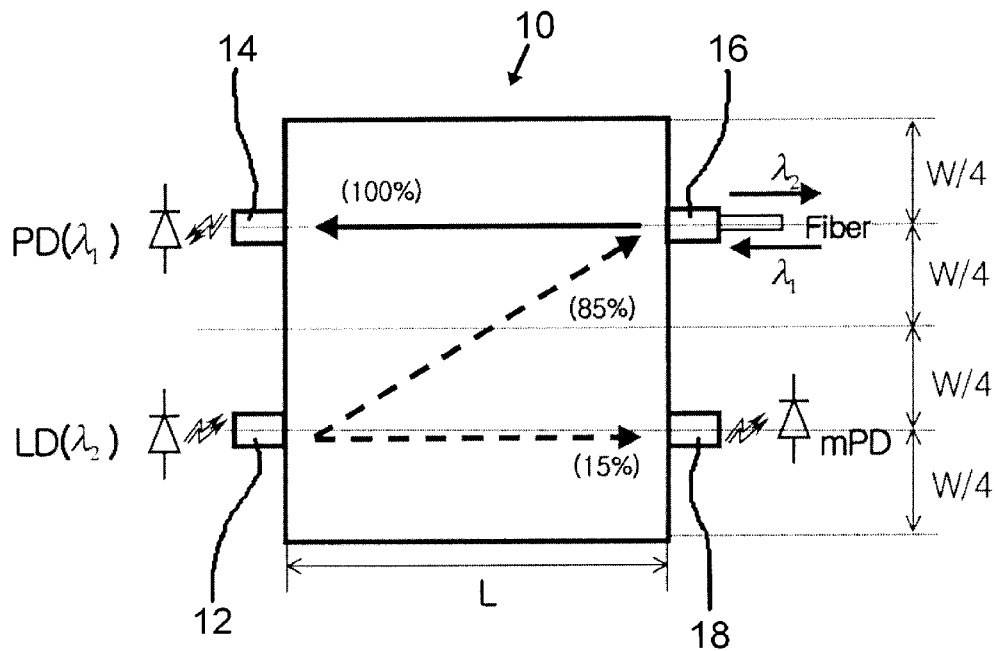

FIGS. 3A and 3B show the optical waveguide filter using a multi-mode interference according to a third preferred embodiment of the present invention.

The optical waveguide filter 10 includes has a width W, a length L and a thickness d, and provides a strong guiding.

Input/output (I/O) terminals 12, 14 and 16 are arranged on both sides of the optical waveguide filter 10. A laser diode LD is coupled to the IO terminal 12 as a transmitting light source. A photo detector PD is coupled to the IO terminal 14. An optical fiber is coupled to the IO terminal 16 as a transmission line. A monitoring photo detector mPD is coupled to the IO terminal 18.

An input beam of a wavelength $\lambda_1$ from the optical fiber progresses to the photo detector, and one self-image is formed in a cross state or in a bar state. An output beam of a wavelength $\lambda_2$ from the transmitting light source is transferred to the optical fiber (85%) and to the monitoring photo detector (15%) such that four images are overlapped to have two overlapping images by an image overlapping according to an intensity and a relative phase.

In case that the I/O terminals are located at a W/4 position or a 3W/4 position of the optical waveguide filter 10, when a general interference is used, a length that a desired number of the self-images are formed is obtained by Equation 12 using Equations 1 and 2:

$$L^{\lambda 1}_{N=1} = p(3L^{\lambda 1}_\pi), \; L^{\lambda 2}_{N=4} = \frac{q}{4}(3L^{\lambda 2}_\pi) \qquad \text{Equation 12}$$

wherein N denotes the number of a self-image, $\lambda_1$ and $\lambda_2$ denote a wavelength, and "p" and "q" denote an integer. When the output beam of the optical fiber is a cross state, "p" denotes an odd number and "q" denotes "8n+3" or "8n+5". When the output beam of the optical fiber is a bar state, "p" denotes an even number, and "q" denotes "8n+1" or "8n+7" (n=0,1,2, . . . ).

A beat length ratio between two wavelengths depends a structure of the optical waveguide filter and a wavelength. In this case, since a transmission is performed in one optical waveguide filter, there is no difference in structure of the optical waveguide filter. Therefore, a beat length ratio becomes proportional to a ratio of two wavelengths. As can be seen in Equation 2, when a wavelength is varied, a beat length is varied. Accordingly, a length of the optical waveguide filter is determined by an integer that lengths of two wavelengths are equal.

A beat length ratio that is a parameter to obtain a length of the optical waveguide filter is obtained by Equation 13:

$$\text{Beat length ratio}_{1,2} = \frac{L^{\lambda 1}_{\pi N=1}}{L^{\lambda 2}_{\pi N=4}} = \frac{4p}{q}. \qquad \text{Equation 13}$$

Assume that the optical waveguide filter 10 of FIGS. 3A and 3B has a silica-on-silicon structure and has a width of 36 μm and a thickness of 6 μm. When Ge is doped into a core of the optical waveguide filter 10 so that there occurs a refractive index difference of 0.75% between the core and the cladding, $n_{core}$ is 1.3692, and $n_{cladding}$ is 1.3590. At this time, when $\lambda_1$ is 1550 nm and $\lambda_2$ is 1310 nm, a beat length ratio (4p/q) becomes close to 1.183, and an integer ratio to have a minimum length is 8/7, whereby $$L = 8\frac{3}{4}L^{1550}_\pi \cong \frac{3}{4}L^{1310}_\pi = 11032.1 \; \mu m.$$

Figure 4A:
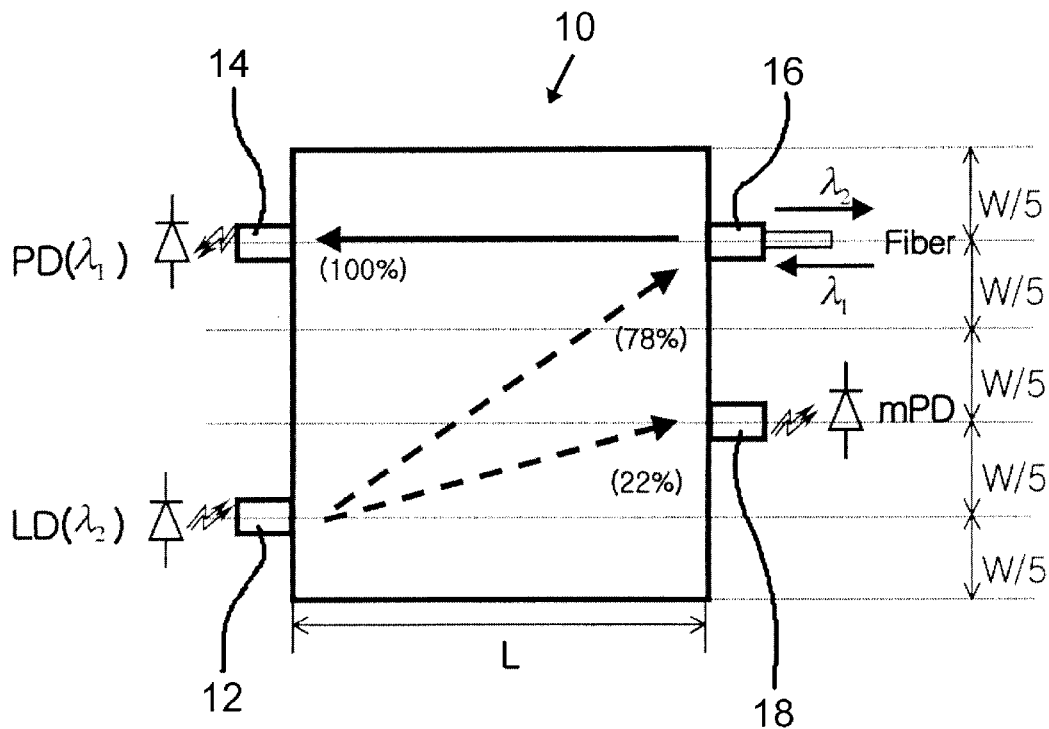
FIGS. 4A and 4B show the optical waveguide filter using a multi-mode interference according to a fourth preferred embodiment of the present invention.
Figure 4B:
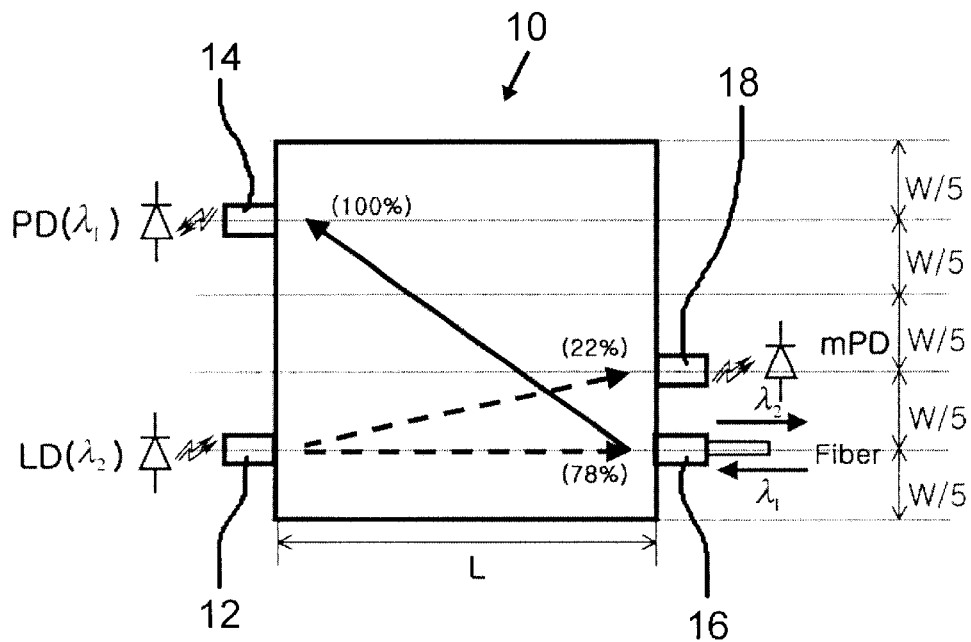

FIGS. 4A and 4B show the optical waveguide filter using a multi-mode interference according to a fourth preferred embodiment of the present invention.

The optical wavguide filter 10 has a width W, a length L and a thickness d, and provide a strong guiding.

Input/output (I/O) terminals 12, 14 and 16 are arranged on both sides of the optical waveguide filter 10. A laser diode LD is coupled to the IO terminal 12 as a transmitting light source. A photo detector PD is coupled to the IO terminal 14. An optical fiber is coupled to the IO terminal 16 as a transmission line. A monitoring photo detector mPD is coupled to the IO terminal 18.

An input beam of a wavelength $\lambda_1$ from the optical fiber progresses to the photo detector, and one self-image is formed in a cross state or in a bar state. An output beam of a wavelength $\lambda_2$ from the transmitting light source is transferred to the optical fiber (78%) and to the monitoring photo detector (22%) such that five images are overlapped to have two overlapping images by an image overlapping according to an intensity and a relative phase.

In case that the I/O terminals are located at a W/5 position, a 2W/5 position, a 3W/5 position or a 4W/5 position of the optical waveguide filter 10, when a general interference is used, a length that a desired number of the self-images are formed is obtained by Equation 14 using Equations 1 and 2:

$$L^{\lambda 1}_{N=1} = p(3L^{\lambda 1}_\pi), \; L^{\lambda 2}_{N=4} = \frac{q}{5}(3L^{\lambda 2}_\pi), \qquad \text{Equation 14}$$

wherein N denotes the number of a self-image, $\lambda_1$ and $\lambda_2$ denote a wavelength, and "p" and "q" denote an integer. When the output beam of the optical fiber is a cross state and when the output beam of the optical fiber is a bar state, "p" and "q" are shown in Table 1. Table 1 shows a combination of "p" and "q" according to a location of the I/O terminals of the optical waveguide filter 10.

TABLE 1

| | | Cross state | | | | Bar state | | | |
|---|---|---|---|---|---|---|---|---|---|
| PD | LD | Fiber | MPD | P | q | Fiber | mPD | P | q |
| W/5 | 2W/5 | 4W/5 | 2W/5 | Odd | 10n ± 2 | W/5 | 3W/5 | Even | 10n ± 3 |
| | | 3W/5 | | | 10n ± 3 | | | | 10n ± 2 |
| | | 4W/5 | | | 10n ± 4 | | | | 10n ± 1 |
| 2W/5 | W/5 | 3W/5 | W/5 | Odd | 10n ± 2 | 2W/5 | 4W/5 | Even | 10n ± 3 |
| | | 3W/5 | | | 10n ± 4 | | | | 10n ± 1 |
| | | 4W/5 | | | 10n± 3 | | | | 10n ± 2 |
| 3W/5 | W/5 | 2W/5 | 4W/5 | Odd | 10n ± 3 | 3W/5 | W/5 | Even | 10n ± 2 |
| | | 2W/5 | | | 10n ± 4 | | | | 10n ± 1 |
| | | 4W/5 | | | 10n ± 2 | | | | 10n ± 3 |
| 4W/5 | W/5 | | | | 10n ± 4 | 4W/5 | 2W/5 | Even | 10n ± 1 |
| | | 2W/5 | W/5 | Odd | 10n ± 3 | | | | 10n ± 2 |
| | | 3W/5 | | | 10n ± 2 | | | | 10n ± 3 |

(n = 0, 1, 2, . . . )

A beat length ratio between two wavelengths depends a structure of the optical waveguide filter and a wavelength. In this case, since a transmission is performed in one optical waveguide filter, there is no difference in structure of the optical waveguide fitler. Therefore, a beat length ratio becomes proportional to a ratio of two wavelengths. As can be seen in Equation 2, when a wavelength is varied, a beat length is varied. Accordingly, a length of the optical waveguide filter is determined by an integer that lengths of two wavelengths are equal.

A beat length ratio that is a parameter to obtain a length of the optical waveguide filter is obtained by Equation 15:

$$\text{Beat length ratio}_{1,2} = \frac{L^{\lambda_1}_{\pi N=1}}{L^{\lambda_2}_{\pi N=5}} = \frac{5p}{q}. \quad \text{Equation 15}$$

Assume that the optical waveguide filter 10 of FIGS. 4A and 4B has a silica-on-silicon structure and has a width of 36 $\mu$m and a thickness of 6 $\mu$m. When Ge is doped into a core of the optical waveguide filter 10 so that there occurs a refractive index difference of 0.75% between the core and the cladding, $n_{core}$ is 1.3692, and $n_{cladding}$ is 1.3590. At this time, when $\lambda_1$ is 1550 nm and $\lambda_2$ is 1310 nm, a beat length ratio (5p/q) becomes close to 1.183, and an integer ratio to have a minimum length is 15/13, whereby $$L = 15\frac{3}{5}L^{1550}_\pi \cong 13\frac{3}{4}L^{1310}_\pi = 16553.1 \ \mu m.$$

As described herein before, the optical waveguide filter using a multi-mode interference according to the present invention has the following advantages.

First, the optical waveguide filter anticipates an optical power distribution ratio. Also, since a length of the optical waveguide filter can be reduced by adjusting a width of the waveguide, an integration and a miniaturization of the optical waveguide filter can be achieved. Further, since the optical waveguide filter has a width of tens of micrometers ($\mu$m), the optical waveguide filter can have a large manufacturing tolerance. The inventive optical waveguide filter can be made insensitively to the TE/TM polarization even though an optical loss occurs. Besides, since the optical waveguide filter is small-sized and can be manufactured in a single manufacturing process, the optical waveguide filter is low in loss resulting from a connection with peripheral elements such as a laser diode or a photo detector.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical waveguide filter using a multi-mode interference and having a predetermined width, a predetermined length and a predetermined thickness, comprising:
   a transmitting light source and a photo detector coupled to one side thereof; and
   a transmission line coupled to the other side thereof,
   wherein one hundred percent of an output optical power having a first wavelength from the transmitting light source is transferred to the transmission line, and one hundred percent of an input optical power having a second wavelength from the transmission line is transferred to the photo detector.

2. The filter of claim 1, wherein a length between the transmission line, and the photo detector and the transmitting line is determined by a beat length ratio.

3. The filter of claim 1, wherein the transmitting light source and the photo detector are located at trisection points of the width of the filter.

4. The filter of claim 1, wherein the transmission line is located at a trisection poin of the width of the filter.

5. An optical waveguide filter using a multi-mode interference and having a predetermined width, a predetermined length and a predetermined thickness, comprising:
   a transmitting light source and a photo detector coupled to one side thereof; and
   a transmission line and a monitoring photo detector coupled to the other side thereof,
   wherein an output optical power having a first wavelength from the transmitting light source is divided at a predetermined percent and transferred to the transmission line and the monitoring photo detector, and one hundred percent of an input optical power having a second wavelength from the transmission line is transferred to the photo detector.

6. The filter of claim 5, wherein a length between the transmission line and the monitoring photo detector, and the photo detector and the transmitting line is determined by a beat length ratio.

7. The filter of claim 5, wherein the transmitting light source and the photo detector are located at trisection points of the width of the filter.

8. The filter of claim 5, wherein the transmitting light source and the photo detector are located at quadrisection points of the width of the filter.

9. The filter of claim 5, wherein the transmitting light source and the photo detector are located at points that the width of the waveguide is divided into five.

10. The filter of claim 5, wherein the transmission line and the monitoring photo detector are located at trisection points of the width of the filter.

11. The filter of claim 5, wherein the transmission line and the monitoring photo detector are located at quadrisection points of the width of the filter.

12. The filter of claim 5, wherein the transmission line and the monitoring photo detector are located at points that the width of the filter is divided into five.

* * * * *